United States Patent [19]

Matsufuji et al.

[11] Patent Number: 5,759,714
[45] Date of Patent: Jun. 2, 1998

[54] NON-AQUEOUS-ELECTROLYTE SECONDARY BATTERY

[75] Inventors: Akihiro Matsufuji; Hiroshi Ishizuka; Masayuki Negoro, all of Minami-ashigara, Japan

[73] Assignee: Fuji Photo Film Co., Ltd., Kanagawa, Japan

[21] Appl. No.: 783,243

[22] Filed: Jan. 14, 1997

[30] Foreign Application Priority Data

Jan. 17, 1996 [JP] Japan .................. 8-005485

[51] Int. Cl.⁶ .................................. H01M 4/36
[52] U.S. Cl. .................................. 429/194
[58] Field of Search .................. 429/188, 194, 429/197, 218

[56] References Cited

U.S. PATENT DOCUMENTS

| | | | |
|---|---|---|---|
| 5,536,597 | 7/1996 | Takahashi et al. | 429/194 |
| 5,639,574 | 6/1997 | Hubbard et al. | 429/192 |

FOREIGN PATENT DOCUMENTS

| | | |
|---|---|---|
| 0615296 | 9/1994 | European Pat. Off. . |
| 0651450 | 5/1995 | European Pat. Off. . |
| 651450A1 | 5/1995 | European Pat. Off. . |
| 0704921 | 4/1996 | European Pat. Off. . |
| 0762521 | 3/1997 | European Pat. Off. . |
| 59-119682 | 7/1984 | Japan . |
| 62-160671 | 7/1987 | Japan . |
| 357169 | 3/1991 | Japan . |
| 6203873 | 7/1994 | Japan . |
| 6333598 | 12/1994 | Japan . |
| 7065863 | 3/1995 | Japan . |
| 7335255 | 12/1995 | Japan . |

*Primary Examiner*—M. Nuzzolillo
*Attorney, Agent, or Firm*—Sughrue, Mionm Zinn, Macpeak & Seas, PLLC

[57] ABSTRACT

There is disclosed a non-aqueous-electrolyte secondary battery comprising a positive electrode including a material capable of reversibly absorbing and releasing lithium, a negative electrode, a non-aqueous electrolyte containing a lithium salt, and a separator of the secondary battery the negative electrode comprises a material mainly comprising an amorphous chalcogen compound and/or an amorphous oxide including three or more atoms selected from the group consisting of Groups 1, 2, 13, 14, and 15 of the Periodic Table, and the said non-aqueous-electrolyte contains at least one N-containing organic compound. This non-aqueous electrolyte secondary battery has excellent charge and discharge characteristics, and its decrease of discharge capacity due to repeated charging/discharging is small.

8 Claims, 1 Drawing Sheet

NON-AQUEOUS-ELECTROLYTE SECONDARY BATTERY

FIELD OF THE INVENTION

The present invention relates to a high-capacity non-aqueous-electrolyte secondary battery excellent in charge and discharge cycle characteristics, and more particularly to an improvement in charge and discharge characteristics, such as charge and discharge cycle life, of a non-aqueous-electrolyte secondary battery having a large discharging capacity and comprising a negative electrode mainly made of an amorphous chalcogen compound and/or an amorphous oxide.

BACKGROUND OF THE INVENTION

As negative electrode materials for non-aqueous-electrolyte secondary batteries, lithium metal (lithium in a form of metal) and lithium alloys are typically used, and when these are used, grown branches of lithium metal resembling tree branches, i.e. so-called dendrites, are formed during the charging/discharging, which can cause an internal short circuit or increase risk of, for example, ignition, because of high activity of the dendrites themselves. To cope with this, a baked carbonaceous material, into which lithium can be reversibly inserted and released from the material, has been put into practical use. The defect of this carbonaceous material is that, since the carbonaceous material itself is electroconductive, lithium metal is sometimes deposited on the carbonaceous material on overcharging or boost charging, ultimately resulting in deposition of dendrites. To avoid this, charging apparatuses are variously contrived, or techniques of preventing overcharging by reducing a positive electrode active material are employed. However in the latter case, the quantity based on the active material is limited, and therefore the discharge capacity is limited. Further, since the density of carbonaceous materials is relatively small, the capacity per volume is low, and therefore the discharge volume is limited inevitably in this respect as well. Use of lithium foil pressed or laminated on a carbon material is disclosed in JP-A ("JP-A" means unexamined published Japanese patent application) Nos. 54165/1986, 82447/1990, 215062/1990, 122974/1991, 272571/1991, 144471/1993, 144472/1993, 144473/1993, and 151995/1993, but in these disclosures, the carbon material is used as a negative electrode active material. Thus, this does not fundamentally solve the above problems.

On the other hand, other known negative electrode materials besides lithium metal, lithium alloys, and carbonaceous materials, include $TiS_2$ and $LiTiS_2$ (U.S. Pat. No. 983,476); lithium compounds containing $WO_2$ and $FeO_3$ (JP-A No. 112070/1991), $Nb_2O_5$ (JP-B ("JP-B" means examined Japanese patent publication) Nos. 59412/1989 and 82447/1990), iron oxides, such as $FeO$, $Fe_2O_3$, and $Fe_3O_4$; and cobalt oxides, such as $CoO$, $Co_2O_3$, and $Co_3O_4$ (JP-A No. 291862/1991); which are capable of absorbing and releasing lithium ions. All of these compounds, however, are low in oxidation-reduction potential and cannot realize a non-aqueous-electrolyte secondary battery having a high-discharge potential on the 3-V level. The discharge capacity of a non-aqueous-electrolyte secondary battery in which these compounds are used is not satisfactory.

As the material of a negative electrode that can realize a non-aqueous-electrolyte secondary battery having a high discharge potential with the average discharge voltage being on the 3-V to 3.6-V level, for the purpose of overcoming the above defects, oxides of Sn, V, Si, B, Zr, etc., and their compound oxides, are suggested (JP-A Nos. 174818/1993, 60867/1994, 275267/1994, 325765/1994, and 338324/1994, and EP-615296). When one of these oxides of Sn, V, Si, B, Zr, or the like, and their compound oxides, is used in combination with a positive electrode of a certain transition metal compound containing lithium, a non-aqueous-electrolyte secondary battery is provided that has a high discharge capacity with the average discharge voltage being on the 3-V to 3.6-V level, the battery hardly forms dendrites in the practical region, and it is quite high in safety, but this non-aqueous-electrolyte secondary battery has the problem that the charge and discharge cycle characteristics are not satisfactory.

Further, for the purpose of improving cycle properties, although it is suggested to allow sodium phenanthrolinesulfonate or the like to be present in a battery (JP-A No. 065863/1995), it is accompanied by such problems that, since these additives are low in solubility, techniques for adding them to an electrolytic solution are difficult, that the prepared electrode is required to be coated only with the additives again, and that, since the additives are difficult to be homogeneously distributed in the battery, batteries are apt to lack uniformity of characteristics.

SUMMARY OF THE INVENTION

An object of the present invention is to provide a non-aqueous-electrolyte secondary battery having a large discharge capacity improved in the charge and discharge cycle characteristics.

Other and further objects, features and advantages of the invention will be apparent from the following description taken in connection with accompanying drawing wherein:

DETAILED DESCRIPTION OF THE INVENTION

Figure 1:
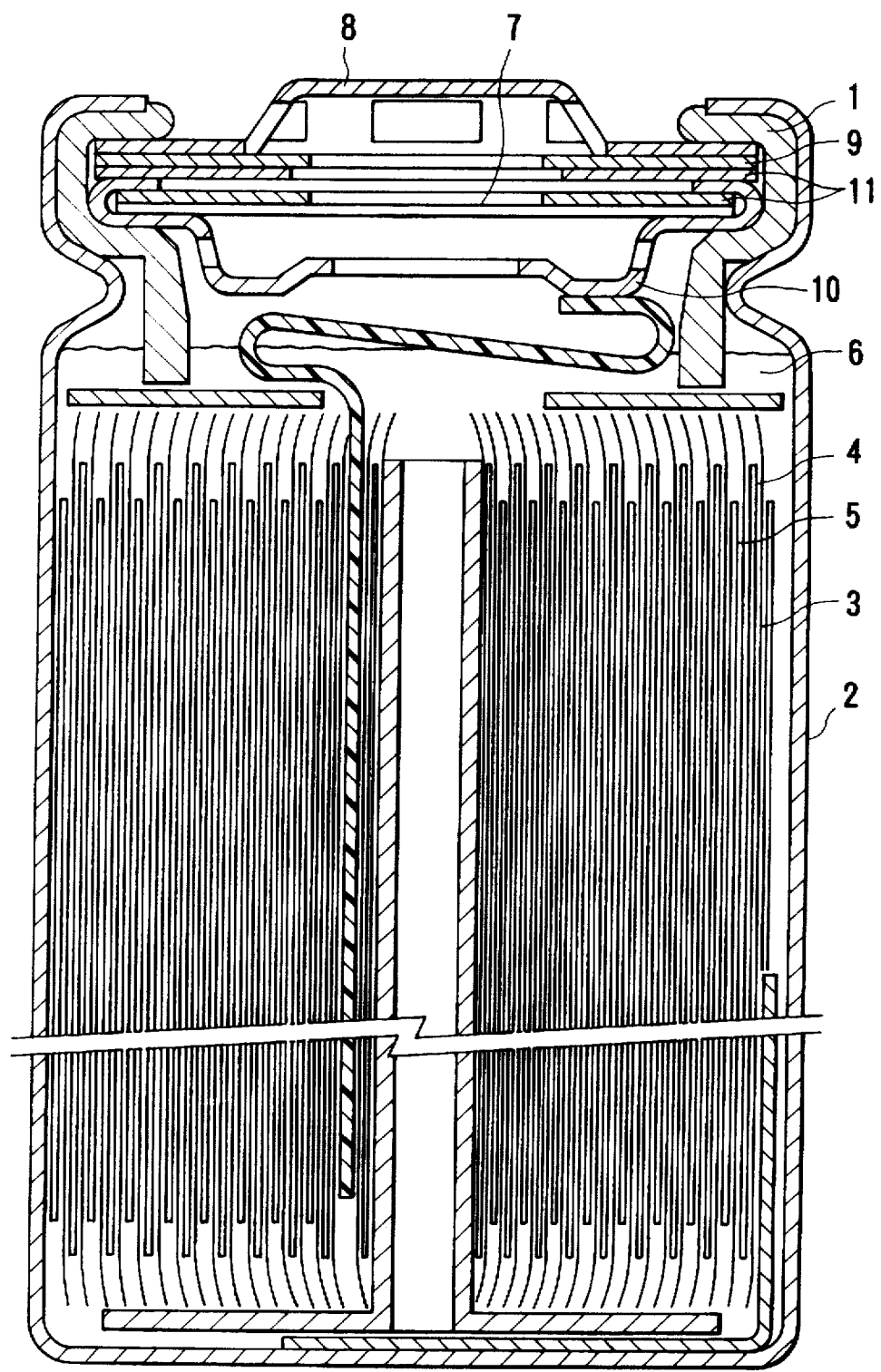
FIG. 1 shows a cross-sectional view of a preferred embodiment a cylinder-type battery of the present invention.

The objects of the present invention have been attained by a non-aqueous-electrolyte secondary battery comprising a positive electrode including a material capable of reversibly absorbing and releasing lithium, a negative electrode, a non-aqueous electrolyte containing a lithium salt, and a separator; wherein the negative electrode comprises an active material mainly comprising an amorphous chalcogen compound and/or an amorphous oxide containing three or more atoms selected from the group consisting of Groups 1, 2, 13, 14, and 15 of the Periodic Table, and the said non-aqueous-electrolyte contains at least one N-containing organic compound.

Preferred embodiments of the present invention are given below, but the present invention is not limited to them.

(1) A non-aqueous-electrolyte secondary battery comprising a positive electrode comprising a material capable of reversibly absorbing and releasing lithium, a negative electrode mainly comprising an amorphous chalcogen compound and/or an amorphous oxide containing three or more atoms selected from the atoms of Groups 1, 2, 13, 14, and 15 of the Periodic Table, a non-aqueous electrolyte containing a lithium salt, and a separator; wherein the said non-aqueous-electrolyte contains at least one N-containing organic compound.

(2) The non-aqueous-electrolyte secondary battery as stated in the above (1), wherein the said at least one N-containing organic compound contained in the said non-aqueous-electrolyte is an N-containing chain compound.

(3) The non-aqueous-electrolyte secondary battery as stated in the above (1), wherein the said at least one N-containing organic compound contained in the said non-aqueous-electrolyte is an N-containing heterocyclic compound.

(4) The non-aqueous-electrolyte secondary battery as stated in the above (1), wherein the said at least one N-containing organic compound contained in the said non-aqueous-electrolyte is an N-containing aromatic compound.

(5) The non-aqueous-electrolyte secondary battery as stated in the above (1), wherein the said at least one N-containing organic compound contained in the said non-aqueous-electrolyte is an N-containing polycyclic condensation compound.

(6) The non-aqueous-electrolyte secondary battery as stated in the above (1), wherein the said at least one N-containing organic compound contained in the said non-aqueous-electrolyte is a metal salt compound.

(7) The non-aqueous-electrolyte secondary battery as stated in any one of the above (1) to (6), wherein the content of the said at least one N-containing organic compound contained in the said non-aqueous-electrolyte is 0.001 to 10 wt. % based on the supporting electrolyte contained in the said electrolyte.

(8) The non-aqueous-electrolyte secondary battery as stated in the above (7), wherein the said supporting electrolyte contains at least $LiBF_4$ and/or $LiPF_6$.

(9) The non-aqueous-electrolyte secondary battery as stated in any one of the above (1) to (8), wherein at least one material of the said negative electrode is represented by the general formula (1):

$$M_1M_{2p}M_{4q}M_{6r} \qquad (1)$$

wherein $M_1$ and $M_2$, which are different from each other, each represent at least one atom selected from the group consisting of Si, Ge, Sn, Pb, p, B, Al,and Sb; $M_4$ represents at least one atom selected from the group consisting of Li, K, Na, Cs, Mg, Ca, Sr, and Ba; $M_6$ represents at least one atom selected from the group consisting of O, S, and Te; p and q are each a figure of 0.001 to 10, and r is a figure of 1.00 to 50.

(10) The non-aqueous-electrolyte secondary battery as stated in the above (1), wherein at least one material of the said negative electrode is represented by the general formula (2):

$$SnM_{3p}M_{5q}M_{7r} \qquad (2)$$

wherein $M_3$ represent s at least one atom selected from the group consisting of Si, Ge, Pb, P, B, and Al; $M_5$ represents at least one atom selected from the group consisting of Li, K, Na, Cs, Mg, Ca, Sr, and Ba; $M_7$ represents at least one atom selected from the group consisting of O and S; p and q are each a figure of 0.001 to 10, and r is a figure of 1.00 to 50.

(11) The non-aqueous-electrolyte secondary battery as stated in any one of the above (1) to (10), wherein the positive electrode comprises a t least one material selected from the group of $Li_xCoO_2$, $Li_xNiO_2$, $Li_xMnO_2$, $Li_xCO_a$ $Ni_{(1-a)}O_2$, $Li_xCo_bV_{(1-b)}O_z$, $Li_xCo_bFe_{(1-b)}Fe_{(1-b)}O_2$, $Li_xMn_2O_4$, $Li_xMn_cCo_{(2-c)}O_4$, $Li_xMn_cNi_{(2-c)}O_4$, $Li_xMn_c$ $V_{(2-c)}O_4$, or $Li_xMn_cFe_{(2-c)}O_4$, wherein x=0.2 to 1.2, a=0.1 to 0.9, b=0.8 to 0.9, c=1.6 to 1.96, and z=2.01 to 2.3.

In the present invention, the charge and discharge cycle characteristics of a non-aqueous-electrolyte secondary battery can be improved, without impairing the high capacity, by including at least one N-containing organic compound in the electrolyte. As N-containing organic compounds that can be used in the present invention, for example, N-containing chain compounds, N-containing heterocyclic compounds, N-containing aromatic compounds, and N-containing metal salt compounds can be mentioned. Herein "charge and discharge characteristics" is the concept that may be judged by both "charge and discharge initial characteristics" and "charge and discharge cycle characteristics (charge and discharge cycle life)."

Herein, N-containing heterocyclic compounds and N-containing aromatic compounds may be monocyclic or polycyclic including the fused ring compounds. Examples of the N-containing organic compounds are shown below, but the present invention is not limited to them.

The N-containing chain compound and the N-containing aromatic compound are amines represented by the general formula $R_1R_2R_3N$. In this formula $R_1$, $R_2$, and $R_3$, which are the same or different from each other, each represent a hydrogen atom, substituted or unsubstituted alkyl group (e.g. methyl, ethyl n-propyl, isopropyl, n-butyl, pentyl, hexyl, heptyl, octyl, nonyl, 2-chloroethyl, 3-methoxyethyl, methoxyethoxyethyl, 2-hydroxyethyl, 3-hydroxypropyl, and trifluoromethyl), a cycloalkyl group (e.g. cyclopropyl and cyclohexyl), an alkoxy group (e.g. methoxy, ethoxy, n-propoxy, and n-butoxy), an alkenyl group (e.g. vinyl, allyl, and 2-pentenyl), an alkynyl group (e.g. ethynyl, 2-propenyl, hexadecynyl), an aralkyl group (e.g. benzyl), an aryl group (e.g. phenyl and naphthyl), a halogen atom, a cyano group, a nitro group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamide group, an oxycarbonylamino group, an oxysulfonylamino group, a ureido group, an acyl group, an oxycarbonyl group, a carbamoyl group, a sulfonyl group, a sulfinyl group, an oxysulfinyl group, or a sulfamoyl group; a carboxylic acid group, a sulfonic acid group, a phosphonic acid group, or a heterocyclic group. $R_1$, $R_2$, and $R_3$ each may be substituted or unsubstituted unless otherwise specified, and specific examples include ethylamine, propylamine, butylamine, hexylamine, cyclohexylamine, ethylenediamine, diethylamine, dipropylamine, triethylamine, tributylamine, tripropylamine, diisopropylethylamine, aniline, N-methylamine, N,N-dimethylaniline, naphthylamine, N,N-dimethylnaphthylamine, diphenylamine, benzylamine, and diphenylmethylamine.

As the nitrogen-containing cyclic compound and the N-containing fused polycyclic compound, for example, compounds listed in "Zen Yuki Kagobutsu Meisho no Tsukeketa," Chapters 4 and 9, written by Liou Chun-Eng (Sankyo-shuppan K. K.), and compounds listed in "Yuki Kagobutsu Meimei-hou/Zen," Sections B and C (translated and written by Kenzo Hirayama and Kazuo Hirayama, Nanko-do), can be mentioned. These compounds may be substituted by possible substituents unless otherwise specified.

Specific examples of the N-containing cyclic compound include pyridine, pyrimidine, pyrrole, 3-pyrroline, quinoline, quinazoline, quinoxaline, phthalazine, piperidine, 2,2,6,6-tetramethylpiperidine, dipiperadinomethane, piperazine, 1,10-phenanthroline, 4,7-diphenyl-1,10-phenanthroline, 1,4-diazabicyclo[2.2.2]octane, morpholine, indole, imidazole, benzimidazole, 1-methylbenzimidazole, 4,4'-dipyridyl, 2,2'-dipyridyl, and 2,2'-dipyridylamine.

Specific examples of the N-containing polycyclic condensation compound include 1,5-diazabicyclo[4.3.0]-5-nonene and 1,8-diazabicyclo[5.4.0]-7-undecene.

Examples of the metal salt compound that can be mentioned are listed in: "Comprehensive Organometallic Chemistry," Pergamon, 1982, written by G. Wilkinson, F. G. A. Stone, E. W. Abel et al.; "Yukikinzoku Handbook," edited by Kinki Kagaku-kogyokai Yukikinzoku-bukai (Asakura-shoten); "Reagents for Organic Synthesis," Vols. 1–15, written by L. Fieser, M. Fieser et al. (John Wiley & Sons); "Kinzoku no Tokusei o Ikashita Atarashii Yukigosei Hanno," edited by Otsuka, Tsuji, Noi, and Mukoyama (Nanko-do, 1977); "Organolithium Methods," written by B. J. Wakefield (Academic Press, 1988); "The Chemistry of Organolithium Compounds," Pergamon Press, 1974; "Yukikinzoku Kagobutsu," edited by Akio Yamamoto (Tokyo Kagakudojin, 1991); and "Shin-jikken Kagaku-koza 24 and 25 ," 4th edition, edited by Nihon Kagakukai (Maruzen, 1991).

Specific examples of the metal salt compound for use in the present invention are shown below, but the present invention is not limited to them.

The metal salt compound is preferably an alkali metal amide represented by formula $R^{12}R^{13}NM$, wherein $R^{12}$ and $R^{13}$, which are the same or different, each represent a hydrogen atom, an alkyl group having 1 to 36 carbon atoms, preferably 1 to 30 carbon atoms, and more preferably 1 to 24 carbon atoms, or a trimethylsilyl group, or $R^{12}$ and $R^{13}$ may bond together to form a ring, and $R^{12}$ and $R^{13}$ each may be substituted by a substituent, and M represents an atom selected from the atoms of Group 1 of the Periodic Table, and preferably M is lithium, sodium, or potassium.

Specific examples of the alkali metal amide compound are shown below, but the present invention is not limited to them.

| C-1 | $(CH_3)_2NLi$ | C-2 | $(CH_3CH_2)_2NLi$ |
| C-3 | $(CH_3)(C_2H_5)NLi$ | C-4 | $(n-C_3H_7)_2NLi$ |
| C-5 | $(i-C_3H_7)_2NLi$ | C-6 | $(n-C_4H_9)_2NLi$ |
| C-7 | $(C_5H_{11})_2NLi$ | C-8 | $(C_6H_{13})_2NLi$ |

C-9 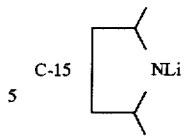

C-10 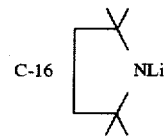

C-11 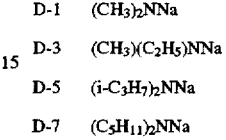

C-12 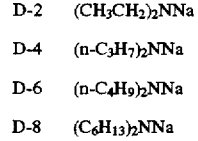

C-13 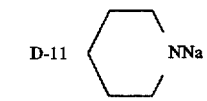

C-14 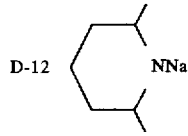

-continued

C-15 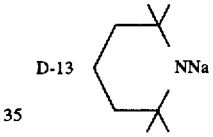

C-16 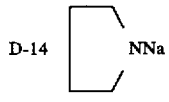

C-17 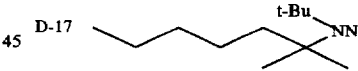

C-18 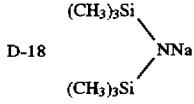

| C-19 | $LiNH_2$ | | |
| D-1 | $(CH_3)_2NNa$ | D-2 | $(CH_3CH_2)_2NNa$ |
| D-3 | $(CH_3)(C_2H_5)NNa$ | D-4 | $(n-C_3H_7)_2NNa$ |
| D-5 | $(i-C_3H_7)_2NNa$ | D-6 | $(n-C_4H_9)_2NNa$ |
| D-7 | $(C_5H_{11})_2NNa$ | D-8 | $(C_6H_{13})_2NNa$ |

D-9 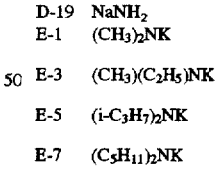

D-10 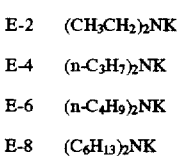

D-11 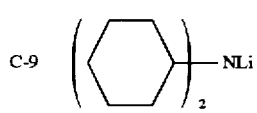

D-12 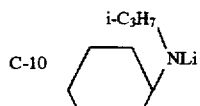

D-13 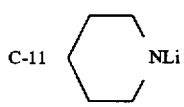

D-14 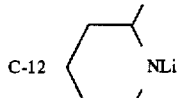

D-15 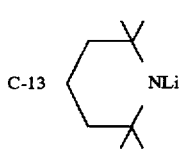

D-16 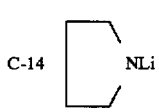

D-17 

D-18 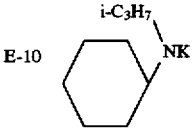

| D-19 | $NaNH_2$ | | |
| E-1 | $(CH_3)_2NK$ | E-2 | $(CH_3CH_2)_2NK$ |
| E-3 | $(CH_3)(C_2H_5)NK$ | E-4 | $(n-C_3H_7)_2NK$ |
| E-5 | $(i-C_3H_7)_2NK$ | E-6 | $(n-C_4H_9)_2NK$ |
| E-7 | $(C_5H_{11})_2NK$ | E-8 | $(C_6H_{13})_2NK$ |

E-9 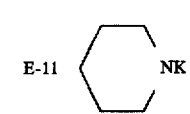

E-10 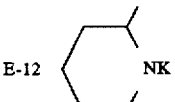

E-11 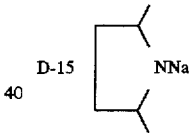

E-12 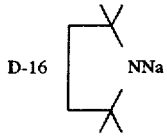

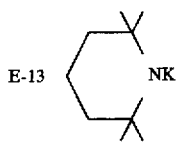
E-13 NK

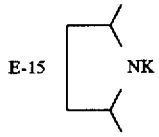
E-15 NK

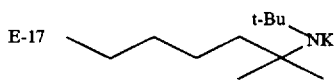
E-17 t-Bu NK

E-19 KNH$_2$

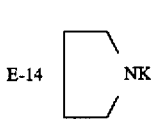
E-14 NK

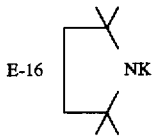
E-16 NK

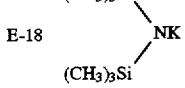
E-18 (CH$_3$)$_3$Si NK / (CH$_3$)$_3$Si

Preferably the content of the N-containing organic compound to be contained in the electrolyte is 0.0001 to 0.1 mol/liter, and more preferably 0.001 to 0.1 mol/liter, of the solvent of the electrolytic solution. Preferably the proportion of the N-containing organic compound to the supporting electrolyte contained in the electrolyte is 0.001 to 10 wt. %, and more preferably 0.01 to 5 wt. %.

The electrolyte is generally composed of a solvent and a supporting electrolyte dissolvable in that solvent. Preferably the supporting electrolyte is a lithium salt (made up of an anion and a lithium cation).

Examples of the solvent of the electrolyte that can be used in the present invention include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone, which may be used alone or as a mixture of two or more. Among them, carbonate solvents, including cyclic carbonates and/or acyclic carbonates, are preferable. As the cyclic carbonate, ethylene carbonate and propylene carbonate are preferable. The acyclic carbonate includes preferably diethyl carbonate, dimethyl carbonate, and methyl ethyl carbonate.

As the supporting electrolyte that can be used in the present invention and that is soluble in these solvents, Li salts can be mentioned, such as LiClO$_4$, LiBF$_4$, LiPF$_6$, LiCF$_3$SO$_3$, LiCF$_3$CO$_2$, LiAsF$_6$, LiSbF$_6$, lithium lower fatty acid carboxylates, LiAlCl$_4$, LiCl, LiBr, LiI, chloroborane lithium, and lithium tetraphenylborate, which may be used alone or as a mixture of two or more. Among others, one having LiBF$_4$ and/or LiPF$_6$ dissolved therein is preferable.

The concentration of the supporting electrolyte is not particularly limited, but preferably the concentration of the supporting electrolyte is 0.2 to 3 mol per liter of the electrolytic solution.

As a combination of electrolytes that can be used in the present invention, an electrolyte comprising LiCF$_3$SO$_3$, LiClO$_4$, LiBF$_4$, and/or LiPF$_6$ together with ethylene carbonate, propylene carbonate, 1,2-dimethoxyethane, dimethyl carbonate, or diethyl carbonate suitably mixed to each other, is preferable. In particular, an electrolyte comprising LiCF$_3$SO$_3$, LiClO$_4$, LiBF$_4$, and/or LiPF$_6$ together with a mixed solvent of propylene carbonate or ethylene carbonate, and 1,2-dimethoxyethane and/or diethyl carbonate, is preferable, with particular preference given to one comprising at least ethylene carbonate and LIPF$_6$.

The amount of these electrolytes to be used in the battery is not particularly limited, and the required amount may depend on the amounts of the positive electrode active material and the negative electrode material and the size of the battery.

Now, other materials of which the non-aqueous-electrolyte secondary battery of the present invention is made, and the method of making the same, are described in detail. The positive and negative electrodes for use in the non-aqueous-electrode secondary battery of the present invention can be made by applying a positive electrode compound or a negative electrode compound on a current collector. The positive electrode compound or the negative electrode compound can contain, in addition to the positive electrode active material or the negative electrode material, a conducting agent, a binder, a dispersant, a filler, an ion-conducting material, a pressure-increasing agent, and various additives.

Preferably, the negative electrode material to be used in the present invention is mainly composed of amorphous material when it is built in the battery. Herein, "mainly amorphous" means that the material has a broad scattering zone having the apex at 20° to 40° in terms of the 2θ value by X-ray diffractometry using a CuK α beam, and the material may have diffraction lines due to crystallinity. Preferably the strongest intensity in the diffraction lines due to crystallinity found in 40° or more, but 70° or less, in terms of the 2θ value, is 500 times or less, more preferably 100 times or less, and particularly preferably 5 times or less, the intensity of the diffraction line of the apex of the broad scattering zone found in 20° or more, but 40° or less, in terms of the 2θ value. Most preferably there are no diffraction line is due to crystallinity.

Preferably, the negative electrode material for use in the present invention is represented by the following general formula (1):

$$M_1M_{2p}M_{4q}M_{6r} \qquad (1)$$

wherein $M_1$ and $M_2$, which are different from each other, each represent at least one member selected from among Si, Ge, Sn, Pb, P, B, Al, and Sb, preferably Si, Ge, Sn, P, B, and Al, and particularly preferably Si, Sn, P, B, and Al; $M_4$ represents at least one member selected from among Li, Na, K, Rb, Cs, Mg, Ca, Sr, and Ba, preferably K, Cs, Mg, and Ca, and particularly preferably Cs and Mg; $M_6$ represents at least one member selected from among O, S, and Te, preferably C and S, and particularly preferably O; p and q are each 0.001 to 10, preferably 0.01 to 5, and particularly preferably 0.01 to 2; r is 1.00 to 50, preferably 1.00 to 26, and particularly preferably 1.02 to 6; the valence numbers of $M_1$ and M2 are not particularly restricted, and each may be made up of a single valence number or a mixture of valence numbers; $M_1$, $M_2$, and M4 are in such a ratio that $M_2$ and $M_4$ may be changed continuously in the range of 0.001 to 10 mol equivalents for $M_1$, and the amount of $M_6$ (the value of r in the general formula (1)) is also changed in conformity to it.

Among the compounds mentioned above, preferably $M_1$ is Sn in the present invention and it is represented by the general formula (2):

$$SnM_{3p}M_{5q}M_{7r} \qquad (2)$$

wherein $M_3$ represents at least one-member selected from the group consisting of Si, Ge, Pb, P, B, and Al, preferably Si, Ge, P, B, and Al, and particularly preferably Si, P, B, and Al; $M_5$ represents at least one member selected from the group consisting of Li, Na, K, Rb, Cs, Mg, Ca, Sr, and Ba, preferably Cs and Mg, and particularly preferably Mg; $M_7$ represents at least one member selected from the group consisting of O and S, and preferably O; p and q are each 0.001 to 10, preferably 0.01 to 5, more preferably 0.01 to 1.5; and particularly preferably 0.7 to 1.5, and r is 1.00 to 50, preferably 1.00 to 26, and more preferably 1.02 to 6.

Examples of the negative electrode material of the present invention are shown below, but the present invention is not limited to them.

$SnAl_{0.4}B_{0.5}P_{0.5}K_{0.1}O_{3.65}$, $SnAl_{0.4}B_{0.5}P_{0.5}Na_{0.2}O_{3.7}$, $SnAl_{0.4}B_{0.3}P_{0.5}Rb_{0.2}O_{3.4}$, $SnAl_{0.4}B_{0.5}P_{0.5}Cs_{0.1}O_{3.65}$, $SnAl_{0.4}B_{0.3}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$, $SnAl_{0.3}B_{0.5}P_{0.2}O_{2.7}$, $SnAl_{0.3}B_{0.5}P_{0.2}O_{2.7}$, $SnAl_{0.4}B_{0.5}P_{0.3}Ba_{0.08}Mg_{0.08}O_{3.26}$, $SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$, $SnB_{0.5}P_{0.5}Li_{0.1}Mg_{0.1}F_{0.2}O_{3.05}$, $SnB_{0.5}P_{0.5}K_{0.1}Mg_{0.1}F_{0.2}O_{3.05}$, $SnB_{0.5}P_{0.5}K_{0.1}Mg_{0.05}F_{0.1}O_{3.03}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_3$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.53}$, $Sn_{1.1}Al_{0.4}B_{0.2}P_{0.6}Ba_{0.08}F_{0.08}O_{3.54}$, $Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.34}$, $Sn_{1.1}Al_{0.4}PCs_{0.05}O_{4.23}$, $Sn_{1.1}Al_{0.4}PK_{0.04}O_{4.23}$, $Sn_{1.2}Al_{0.5}B_{0.3}P_{0.4}Cs_{0.2}O_{3.5}$, $Sn_{1.2}Al_{0.4}B_{0.2}P_{0.6}Ba_{0.08}O_{3.68}$, $Sn_{1.2}Al_{0.4}B_{0.2}P_{0.6}Ba_{0.08}F_{0.08}O_{3.64}$, $Sn_{1.2}Al_{0.4}B_{0.2}P_{0.6}Mg_{0.04}Ba_{0.04}O_{3.68}$, $Sn_{1.2}Al_{0.4}B_{0.3}P_{0.5}Ba_{0.08}O_{3.58}$, $Sn_{1.3}Al_{0.3}B_{0.3}P_{0.4}Na_{0.2}O_{3.3}$, $Sn_{1.3}Al_{0.2}B_{0.4}P_{0.4}Ca_{0.2}O_{3.4}$, $SN_{1.3}Al_{0.4}B_{0.4}P_{0.4}Ba_{0.2}O_{3.6}$, $Sn_{1.4}Al_{0.4}PK_{0.2}O_{4.6}$, $Sn_{1.4}Al_{0.2}Ba_{0.1}PK_{0.2}O_{4.45}$, $Sn_{1.4}Al_{0.2}Ba_{0.2}PK_{0.2}O_{4.6}$, $Sn_{1.4}Al_{0.4}Ba_{0.2}PK_{0.2}Ba_{1.1}F_{0.2}O_{4.9}$, $Sn_{1.4}Al_{0.4}PK_{0.3}O_{4.65}$, $Sn_{1.5}Al_{0.2}PK_{0.2}O_{4.4}$, $Sn_{1.5}Al_{0.4}PK_{0.1}O_{4.65}$, $Sn_{1.5}Al_{0.4}PCs_{0.05}O_{4.63}$, $Sn_{1.5}Al_{0.4}PCs_{0.05}Mg_{0.1}F_{0.2}O_{4.63}$, $SnSi_{0.5}Al_{0.1}B_{0.2}P_{0.1}Ca_{0.4}O_{3.1}$, $SnSi_{0.4}Al_{0.2}B_{0.4}O_{2.7}$, $SnSi_{0.5}Al_{0.2}B_{0.1}P_{0.1}Mg_{0.1}O_{2.8}$, $SnSi_{0.6}Al_{0.2}B_{0.2}O_{2.8}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$, $SnSi_{0.6}Al_{0.1}B_{0.3}P_{0.1}O_{3.05}$, $SnSi_{0.6}Al_{0.2}Mg_{0.2}O_{2.7}$, $SnSi_{0.6}Al_{0.2}Ca_{0.2}O_{2.7}$, $SnSi_{0.6}Al_{0.2}P_{0.2}O_3$, $SnSi_{0.6}B_{0.2}P_{0.2}O_3$, $SnSi_{0.8}Al_{0.1}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}$, $SnSi_{0.8}Ca_{0.2}O_{2.8}$, $SnSi_{0.8}P_{0.2}O_{3.1}$, $Sn_{0.9}Mn_{0.3}B_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.8}Pb_{0.2}Ca_{0.1}P_{0.9}O_{3.35}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$ and $Sn_{0.2}Ge_{0.8}Ba_{0.1}P_{0.9}O_{3.35}$.

The chemical formulae of the above compounds obtained by baking can be determined by inductively coupled plasma (ICP) emission spectrochemical analysis, or simply from the difference in weight of the powder before and after the baking.

The amount of insertion of a light metal into the negative electrode material of the present invention may be such that it reaches approximately to the deposition potential of that light metal, and, for example, preferably the amount is 50 to 700 mol %, and particularly preferably 100 to 600 mol %, based on the negative electrode material. The larger the emission amount to the insertion amount is, the more preferable it is. The method of insertion of a light metal is preferably an electrochemical method, a chemical method, or a thermal method. As the electrochemical method, a method in which a light metal contained in a positive electrode active material is electrochemically inserted, or a method in which a light metal or a light metal from its alloy is directly inserted electrochemically is preferable. As the chemical method, a method wherein a light metal is mixed or contacted with the negative electrode material, or an organometallic compound, such as butyl lithium, is reacted with the negative electrode material. The electrochemical method and the chemical method are preferable. The light metal is particularly preferably lithium or lithium ions.

In the present invention, using the compounds represented by the above general formulae (1) and (2) as a main negative electrode material, a non-aqueous-electrolyte secondary battery excellent in charge and discharge cycle characteristics, high in discharge voltage, capacity, and safety, and excellent in high-electric current properties can be obtained. In the present invention, when a compound containing Sn, with its valence number being 2, is used as a negative electrode material, a particularly excellent effect can be obtained. The valence number of Sn can be found by chemical titration, for example, by a method described in Physics and Chemistry of Glasses, Vol. 8, No. 4 (1967), page 165. The valence number can also be determined from Knight Shift by the measurement of Sn by solid nuclear magnetic resonance (NMR). For example, in broad-line NMR measurement, for $Sn(CH_3)_4$, metal Sn (zero-valent Sn) has peaks appearing near 7,000 ppm, which is at an extremely low-magnetic field, SnO (bivalence) has a peak near 100 ppm, and $SnO_2$ (tetravalence) has a peak appearing near –600 ppm. Thus, if they have the same ligands, Knight Shift depends largely on the valence number of the central metal, and the valence number can be determined based on the position of the peak obtained by the 119Sn-NMR measurement.

Various compounds can be contained in the negative electrode material used in the present invention. For example, transition metals (Sc, Ti, V, Cr, Mn, Fe, Co, Ni, Cu, Zn, Y, Zr, Nb, Mo, Tc, Ru, Rh, Pd, Ag, Cd, lanthanides, Hf, Ta, W, Re, Os, Ir, Pt, Au, and Hg) and elements of Group 17 (F, Cl) of the Periodic Table can be contained. As a dopant various compounds that can increase electron conductivity (e.g. compounds of Sb, I, and Nb) can also be contained. The amount of the compound that may be added is preferably 0 to 20 mol %.

As the method of synthesizing a compound oxide mainly composed of an oxide represented by the general formula (1) or (2) in the present invention either of a baking method and a solution method can be used.

For example, more particularly, in the case of the baking method, an $M_1$ compound, an $M_2$ compound, and an $M_4$ compound ($M_1$ and $M_2$, which are different from each other, each represent Si, Ge, Sn, Pb, P, B, Al, or Sb, and $M_4$ represents Mg, Ca, Sr, or Ba) may be mixed and baked. Examples of the Sn compound include SnO, $SnO_2$, $Sn_2O_3$, $Sn_3O_4$, $Sn_7O_{13}\cdot H_2O$, $Sn_8O_{15}$, stannous hydroxide, stannic oxyhydroxide, stannic acid, stannous oxalate, stannous phosphate, orthostannic acid, metastannic acid, parastannic acid, stannous fluoride, stannic fluoride, stannous chloride, stannic chloride, stannous pyrophosphate, tin phosphide, stannous sulfide, and stannic sulfide.

Examples of the Si compound include $SiO_2$, SiO; organosilicon compounds, such as tetremethylsilane and tetraethylsilane; alkoxysilane compounds, such as tetramethoxysilane and tetraethoxysilane; and hydrogensilane compounds, such as trichlorohydrogensilane.

Examples of the Ge compound include $GeO_2$, GeO, and alkoxy germanium compounds, such as germanium tetramethoxide and germanium tetramethoxide.

Examples of the Pb compound include $PbO_2$, PbO, $Pb_2O_3$, $Pb_3O_4$, lead nitrate, lead carbonate, lead formate, lead acetate, lead tetraacetate, lead tartrate, lead diethoxide, and lead di(isopropoxide).

Examples of the P compound include phosphorus pentoxide, phosphorus oxychloride, phosphorus pentachloride, phosphorus trichloride, phosphorus tribromide, trimethyl phosphate, triethyl phosphate, tripropyl phosphate, stannous pyrophosphate, and boron phosphate.

Examples of the B compound include diboron trioxide, boron trichloride, boron tribromide, boron carbide, boric acid, trimethyl borate, triethyl borate, tripropyl borate, tributyl borate, boron phosphide, and boron phosphate.

Examples of the Al compound include aluminum oxide (a-alumina and β-alumina), aluminum silicate, aluminum-tri-iso-propoxide, aluminum tellurite, aluminum chloride, aluminum boride, aluminum phosphide, aluminum phosphate, aluminum lactate, aluminum borate, aluminum sulfide, aluminum sulfate, and aluminum boride.

Examples of the Sb compound include diantimony trioxide and triphenylanitimony.

Examples of the Mg, Ca, Sr, and Ba compounds include various oxides, hydroxides, carbonates, phosphates, sulfates, nitrates, and aluminum compounds.

The baking conditions are such that preferably the heating rate is 4° C. or more, but 2,000° C. or less; more preferably 6° C. or more, but 2,000° C. or less; and particularly preferably 10° C. or more, but 2,000° C. or less, per min; preferably the baking temperature is 250° C. or more, but 1,500° C. or less; more preferably 350° C. or more, but 1,500° C. or less; and particularly preferably 500° C. or more, but 1,500° C. or less; preferably the baking time is 0.01 hour or more, but 100 hours or less; more preferably 0.5 hour or more, but 70 hours or less; and particularly preferably 1 hour or more, but 20 hours or less; and preferably the cooling rate is 2° C. or more, but 107° C. or less; more preferably 4° C. or more, but 107° C. or less; particularly preferably 6° C. or more, but 107° C. or less; and more particularly preferably 10° C. or more, but 107° C. or less, per min.

In the present invention, "heating rate" means the average rate of the temperature rise from "50% of the baking temperature in °C." to "80% of the baking temperature in °C.," and "cooling rate" means the average rate of the temperature descent from "80% of the baking temperature in °C." to "50% of the baking temperature in °C."

The cooling may be carried out in a baking furnace, or it may be carried out in such a manner that the product is taken out of the furnace and is charged into water, to be cooled. Ultra-rapid cooling methods, such as the gun method, the Hammer-Anvil method, the slap method, the gas atomizing method, the plasma spray method, the centrifugal quenching method, and the melt drag method, described in Ceramic Processing (Gihodo-shuppan, 1987), page 217, can be used. The cooling also can be carried out by using the single roller method or the twin roller method, described in New Glass Handbook (Maruzen, 1991), page 172. When the material is melted during the baking, the baked product may be taken out continuously while the raw material is supplied during the baking. When the material is melted during the baking, preferably the melt is stirred.

Preferably the baking gas atmosphere has an oxygen content of 5 vol.% or less, and more preferably it is an inert gas atmosphere. The inert gas may be, for example, nitrogen, argon, helium, krypton, and xenon.

Preferably the average particle size of the compounds represented by the general formulae (1) and (2) for use in the present invention is 0.1 to 60 μm more preferably 1.0 to 30 μm and particularly preferably 2.0 to 20 μm. To secure a prescribed particle size, a well-known crusher and classifier are used. For example, a mortar, a ball mill, a sand mill, a vibration ball mill, a satellite ball mill, a planetary ball mill, a swirl airflow-type jet mill, a screen, and the like are used. The grinding may be carried out in the presence of water or an organic solvent, such as methanol; that is, the grinding may be carried out, if necessary, in a wet manner. To secure a desired particle diameter, it is preferable to carry out classification. The classification method is not particularly limited, and for the classification, screens, an air classifier, water elutriation, and the like can be used as desired. The classification may be carried out in either a wet manner or dry manner.

A more preferable lithium-containing transition metal oxide positive electrode material for use in the present invention is synthesized preferably by mixing, such that the mole ratio of the sum of the lithium compound/transition metal compound (wherein the transition metal means at least one selected from among Ti, V, Cr, Mn, Fe, Co, Ni, Mo, and W) is from 0.3 to 2.2. A particularly preferable lithium-containing transition metal oxide positive electrode material for use in the present invention is synthesized preferably by mixing, such that the mole ratio of the sum of the lithium compound/transition metal compound (wherein the transition metal means at least one selected from the group of V, Cr, Mn, Fe, Co and Ni) is from 0.3 to 2.2.

A more particularly preferable lithium-containing transition metal oxide positive electrode material for use in the present invention is $Li_xQO_y$ (wherein Q represents mainly transition metals, at least one of which includes Co, Mn, Ni, V, or Fe, and x=0.2 to 1.2, and y=1.4 to 3). Q may contain, in addition to transition metals, for example, Al, Ga, In, Ge, Sn, Pb, Sb, Bi, Si, P, or B mixed therein. Preferably the amount to be mixed is 0 to 30 mol % based on the transition metal.

Examples of a more preferable lithium-containing metal oxide positive electrode material for use in the present invention include $Li_xCoO_2$, $Li_xNiO_2$, $Li_xMnO_2$, $Li_xCo_aNi_{1-a}O_2$, $Li_xCo_bV_{1-b}O_2$, $Li_xCo_bFe_{1-b}O_2$, $Li_xMn_2O_4$, $Li_xMn_cCO_{2-c}O_4$, $Li_xMn_cNi_{2-c}O_4$, $Li_xMn_cV_{2-c}O_4$, and $Li_xMn_cFe_{2-c}O_4$ (wherein x=0.7 to 1.2, a=0.1 to 0.9, b=0.8 to 0.98, c=1.6 to 1.96, and z=2.01 to 2.3).

Examples of the most preferable lithium-containing transition metal oxide positive electrode material for use in the present invention include $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x=0.7 to 1.2, a=0.1 to 0.9, b=0.9 to 0.98, and z=2.01 to 2.3).

Examples of the most preferable lithium-containing transition metal oxide positive electrode material for use in the present invention include $Li_xCoO_2$, $Li_xNiO_2$, $Li_xMnO_2$, $Li_xCO_aNi_{1-a}O_2$, $Li_xMn_2O_4$, and $Li_xCo_bV_{1-b}O_z$ (wherein x=0.7 to 1.2, a=0.1 to 0.9, b=0.9 to 0.98, and z=2.02 to 2.3).

The above value of x is the value before the start of charging/discharging, and it will change due to charging/discharging.

The conductive carbon compound that can be used in the present invention is any electron-conducting material that will not undergo a chemical change in the assembled battery. Specific examples include natural graphites, such as flaky graphite, plate-like graphite, and massive graphite; high-temperature sintered products obtained, for example, from petroleum coke, coal coke, celluloses, saccharides, and mesophase pitch; graphites, such as artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes. Among these, graphites and carbon blacks are preferable.

As conducting agents other than the carbon-type conducting agents, conductive fibers, such as metal fibers; metal powders, for example, of copper, nickel, aluminum, or silver; conductive whiskers, for example, of zinc oxide and potassium titanate; and conductive metal oxides, such as titanium oxide, which are used singly or as a mixture of them, as required, can be contained.

The amount of the conducting agent to be added to the composition layer is preferably 6 to 50 wt. %, and particularly preferably 6 to 30 wt. %, based on the negative electrode material or the positive electrode material. In the case of carbon or graphite, that amount is particularly preferably 6 to 20 wt. %.

As the binding agent for retaining the electrode composition for use in the present invention, polysaccharides, thermoplastic resins, and elastic polymers can be used, singly or as a mixture of them. Example of preferable binding agents are water-soluble polymers, such as starches, carboxymethylcellulose, cellulose, diacetylcellulose, methylcellulose, hydroxyethylcellulose, hydroxypropylcellulose, sodium alginate, polyacrylic acid, sodium polyacrylate, polyvinylphenol, polyvinyl methyl ether, polyvinyl alcohol, polyvinyl pyrrolidone, polyacrylamide, polyhydroxy(metha)acrylate, water-soluble polymers, and styrene/maleic acid copolymers; polyvinyl chloride, polytetrafluoroethylene, polyvinylidene fluoride, tetrafluoroethylene/hexafluoropropylene copolymers, vinylidene fluoride/tetrafluoroethylene/hexafluoropropylene copolymers, polyethylene, polypropylene, ethylene/propylene/diene terpolymers (EPDM), sulfonated EPDM, polyvinyl acetal resin; (meth)acrylate copolymers containing a (meth)acrylate, such as methyl methacrylate and 2-ethylhexyl acrylate; polyvinyl ester copolymers containing a vinyl ester, such as (meth)acrylate/acrylonitrile copolymers and vinyl acetate; styrene/butadiene copolymers, acrylonitrile/butadiene copolymers, polybutadiene, neoprene rubber, fluororubber, polyethylene oxide, polyester polyurethane resin, polyether polyurethane resin, polycarbonate polyurethane resin, polyester resin, phenolic resin, and epoxy resin, which are used in the form of an emulsion (latex) or a suspension. Particularly preferable are latexes of polyacrylate, carboxymethylcellulose, polytetrafluoroethylene, and polyvinylidene fluoride.

These binding agents may be used singly or as a mixture of them. If the amount of the binding agent to be added is small, the holding power/cohesive power of the electrode compound is weak and the cycle properties are poor, while if the amount of the binding agent to be added is excessive, the volume of the electrode is increased, to decrease the capacity per unit volume or unit weight of the electrode, and the conductivity is lowered, to decrease further the capacity.

The amount of the binding agent to be added is not particularly limited, but preferably the amount of the binding agent to be added is 1 to 30 wt. %, and particularly preferably 2 to 10 wt. %, based on the total weight of coating composition.

Preferably the preparation of the negative electrode composition or the positive electrode composition in the present invention is carried out in an aqueous system.

The preparation of the composition paste can be carried out first by mixing an active material and a conducting agent, adding a binding agent (a resin powder made into a form of a suspension or emulsion (latex)) and water thereto, kneading them, and then dispersing them with a stirring machine/dispersing machine, such as a mixer, a homogenizer, a dissolver, a planetary mixer, a paint shaker, and a sand mill.

The prepared composition paste of the positive electrode active material or the negative electrode active material is used by mainly applying (coating) it onto a current collector, followed by drying and compression. The coating can be carried out in various ways, and example coating methods include the reverse roll method, the direct roll method, the blade method, the knife method, the extrusion method, the curtain method, the gravure method, the bar method, the dip method, and the squeeze method. The blade method, the knife method, and the extrusion method are preferable. The coating is preferably carried out at a rate of 0.1 to 10 m/min. By choosing one of the above coating methods in accordance with the liquid physical properties and drying characteristics of the composition paste, a good surface state of the coating can be obtained. The thickness, the length, and the width of the coating will be determined depending on the size of the battery. Particularly preferably, the thickness of the coating after drying and compression is 1 to 2,000 μm.

As the drying or dehydration method for removing moisture of the pellets or the sheet, a usually adopted method can be used, and, for example, one or a combination of hot air, a vacuum, an infrared ray, a far infrared ray, an electron beam, and low-humidity air can be used. Preferably the temperature is in the range of 80° to 350° C., and particularly preferably in the range of 100° to 250° C. The water content is preferably 2,000 ppm or less based on the whole battery, and the water content of each of the positive electrode compound, the negative electrode compound, and the electrolyte is preferably 500 ppm or less, in view of the charge and discharge cycle characteristics.

To compress the electrode compound in the form of a sheet, a usually employed press method can be used, and particularly the mold press method and the calender press method are preferable. The pressing pressure is not particularly limited and is preferably 10 kg/cm² to 3 t/cm². The pressing speed of the calender press method is preferably 0.1 to 50 m/min. The pressing temperature is preferably room temperature to 200° C.

With respect to the material of the support, that is, the current collector, of the positive electrode or the negative electrode that can be used for the present invention, in the case of the positive electrode, its material is aluminum, a stainless steel, nickel, titanium, or an alloy of these metals, and in the case of the negative electrode, the material is copper, a stainless steel, nickel, titanium, or an alloy of these metals. The form of the electrode is foil, expanded metal, punching metal, or wire mesh. Particularly preferably, the positive electrode is in the form of aluminum foil, and the negative electrode is in the form of copper foil.

As the separator that can be used in the present invention, an insulating thin film that is high in ion permeability and that has a prescribed mechanical strength, is suitable. As the material of the separator, an olefin polymer, a fluorine-containing polymer, a cellulose polymer, a polyimide, a nylon, glass fiber, or alumina fiber, in the form of a nonwoven fabric, a woven fabric, or a microporous film, can be used. Particularly as its material, a polypropylene, a polyethylene, a mixture of a polypropylene and a polyethylene, a mixture of a polypropylene and Teflon (Tradename, polytetrafluoroethylene), or a mixture of a polyethylene and Teflon, is preferable, and preferably it is in the form of a microporous film. Particularly preferable is a microporous film having a pore diameter of 0.01 to 1 µm and a thickness of 5 to 50 µm.

The battery may be in the shape of any of a button, a coin, a sheet, a cylinder, a polygon, and the like. The electrodes, rolled together with separators in the form of pellets or sheets, are inserted into a battery can, the can and the electrode are electrically connected, the electrolytic solution is injected, and the can is sealed, to form a battery. At that time, a safety valve is used as a sealing plate. Further, to secure the safety of the battery, preferably a PTC element (which means a positive temperature coefficient element) is used.

Examples of the material of the bottomed armoring can for a battery that can be used for the present invention include a ferrous plate plated with nickel, a stainless steel plate (e.g. SUS304, SUS304L, SUS304N, SUS316, SUS316L, SUS430, and SUS444), a stainless steel plate (e.g. SUS304, SUS304L, SUS304N, SUS316, SUS316L, SUS430, and SUS444) plated with nickel, aluminum or its alloy, nickel, titanium, and copper, which may take the shape of a round cylinder, an elliptical cylinder, a square cylinder, or a rectangular cylinder. Particularly, when the armoring can also serves as a negative electrode terminal, preferably the material of the armoring can is a stainless steel plate or a nickel-plated ferrous plate, while when the armoring can also serves as a positive electrode terminal, preferably the material of the armoring can is a stainless steel plate, or aluminum or its alloy.

The said sheet-like electrodes with the composition coated may be rolled or folded and are inserted into the can, the sheets and the can are electrically connected, the electrolyte is injected, and a battery can is formed by using a sealing plate. At that time, a safety valve can be used as the sealing plate. Besides the safety valve, conventionally known various safety elements may be applied. For example, as an overcurrent preventive element, a fuse, a bimetal, a PTC element, or the like may be used. Besides the safety valve, as a measure against an internal pressure increase in the battery can, a technique wherein a slit is formed in the battery can, a gasket cracking technique, or a sealing plate cracking technique can be used. Further, the battery charger may be equipped with a circuit in which measures against overcharging or overdischarging are built.

The electrolyte may be injected all at once, but preferably it is injected in two or more stages. When the electrolyte is injected in two or more stages, the composition of the electrolyte may be the same or different each time (for example, after a non-aqueous solvent or a solution of a lithium salt dissolved in a non-aqueous solvent is injected, a non-aqueous solvent having a viscosity higher than that of the former nonaqueous solvent, or a solution of a lithium salt dissolved in a non-aqueous solvent, is injected). Further, for example, to shorten the period for injecting the electrolyte, the pressure in the battery can may be reduced (preferably to 500 to 1 torr, and more preferably to 400 to 10 torr), or the battery can may be subjected to a centrifugal force or ultrasonic waves.

For the can and the lead plate, an electrically conductive metal or alloy can be used. For example, such a metal as iron, nickel, titanium, chromium, molybdenum, copper, and aluminum, or their alloies, can be used. As the welding method of the cap, the can, the sheet, and the lead plate, a known method (e.g. DC or AC electric welding, laser welding, or ultrasonic welding) can be used. As the sealer for sealing, a conventionally known compound or a mixture, such as asphalt, is used.

Examples of the gasket that can be used for the present invention include an olefin polymer, a fluorine-containing polymer, a cellulose polymer, a polyimide, and a polyamide, and in view of the organic-solvent resistance and the low water permeability, an olefin polymer is preferable, and particularly a polymer mainly made up of propylene is preferable. A block copolymer of propylene and ethylene is more preferable.

If necessary, the battery of the present invention is covered with an exterior member. The exterior member includes, for example, heat-shrinkable tubing, adhesive tape, metal film, paper, cloth, paint, and a plastic casing. Further, at least part of the exterior member may be provided with a section that will change in color owing to heat, so that the thermal history in use can be seen.

If necessary, the batteries of the present invention, assembled in series and/or in parallel, may be accommodated in a battery pack. The battery pack is provided with safety elements, such as a positive temperature coefficient resistor, a thermal fuse, a fuse and/or a circuit breaking element, as well as a safety circuit (a circuit that is for monitoring, for example, the voltage, the temperature, and the electric current of each battery and/or the set of the batteries, and, if necessary, the circuit has a function for breaking the current). Further, the battery pack may be provided with, in addition to the positive electrode terminal and the negative electrode terminal of the set of the batteries, for example, a positive electrode terminal and a negative electrode terminal for each of the batteries, temperature detection terminals for the set of the batteries and for each of the batteries, and a current sensing terminal for the set of the batteries, as outer terminals. Further, the battery pack may have a built-in voltage-converting circuit (e.g. a DC-DC converter). The connection between the batteries may be fixed by welding lead plates, or it may be fixed for easy detachability by using sockets or the like. Further, the battery pack may be provided with a function for displaying, for example, the remaining capacity of the batteries, whether or not charging has been done, and how often the battery pack has been used.

The battery of the present invention can be used in various apparatuses. Particularly preferably the battery of the present invention is used, for example, in video movie cameras, portable video decks having a built-in monitor, movie cameras having a built-in monitor, compact cameras, single-lens reflex cameras, films with a lens, notebook-type personal computers, notebook-type word processors, electronic notebooks, portable telephones, cordless telephones, shavers, electric tools, electric mixers, and automobiles.

By using an electrolyte that contains an N-containing organic compound as in the present invention, a non-aqueous electrolyte secondary battery that has excellent charge and discharge characteristics, and wherein the decrease of discharge capacity due to repeated charging/discharging is small, can be obtained.

EXAMPLES

The present invention is described with reference to the following examples in detail, which description does not limit the scope of the invention.

Preparation Example of Positive Electrode Composition Paste (Example and Comparative Example)

Positive Electrode Active Material: 200 g of $LiCoO_2$ (obtained by placing a mixture of lithium carbonate and tricobalt tetraoxide, in the mole ratio of 3:2, in an alumina crucible, elevating the temperature in the air to 750° C., at a rate of 2° C. per min. to calcine it for 4 hours, then increasing the temperature to 900° C., at a rate of 2° C. per min. to bake it at that temperature for 8 hours, and disintegrating the resulting product; the median particle diameter, 5 μm; the conductivity and the pH of the dispersion obtained by dispersing 50 g of the washed disintegrated product in 100 ml of water, 0.6 mS/m and 10.1, respectively; the specific surface area measured by the nitrogen adsorption method, 0.42 $m^2$/g) and 10 g of acetylene black were mixed in a homogenizer, and then 8 g of an aqueous dispersion (solid content: 50 wt. %), as a binding agent, of a copolymer of 2-ethylhexyl acrylate, acrylic acid, and acrylonitrile and 60 g of a 2 wt. % aqueous carboxymethylcellulose solution were mixed therewith, followed by kneading, and then 50 g of water was added, and the resulting combination was stirred by a homogenizer, to prepare a positive electrode composition paste.

Preparation Example of Negative Electrode Composition Paste

Negative Electrode Active Material: 200 g of $SnGe_{0.1}B_{0.5}P_{0.58}Mg_{0.1}K_{0.1}O_{3.35}$ (obtained by dry-mixing 6.7 g of tin monoxide, 10.3 g of tin pyrophosphate, 1.7 g of diboron trioxide, 0.7 g of potassium carbonate, 0.4 g of magnesium oxide, and 1.0 g of magnesium dioxide, placing the mixture in an aluminum crucible, elevating the temperature to 1,000° C., at 15° C./min, under an argon atmosphere, calcining the mixture at 1,100° C. for 12 hours; then decreasing the temperature to room temperature, at 10° C./min, taking the crucible out of the baking furnace, collecting the product, and grinding it with a jet mill; having an average particle diameter of 4.5 μm and a broad peak with the apex near 28° in terms of the 2θ value measured by X-ray diffractometry using a CuKα beam, with no diffraction lines at 40° or over, but 70° C. or below, in terms of the 2θ value) and 30 g of a conducting agent (artificial graphite) were mixed in a homogenizer, and then, as a binding agent, a mixture of 50 g of a 2 wt. % aqueous carboxymethylcellulose solution with 10 g of polyvinylidene fluoride, which was in turn mixed with 30 g of water, was added, followed by kneading, to prepare a negative electrode composition paste.

An example of a method for preparing a cylinder-type non-aqueous-electrolyte secondary battery according to an embodiment of the present invention will be explained below, referring to the cross-sectional view shown in FIG. 1.

Preparation of Positive Electrode and Negative Electrode Sheets

The thus prepared positive electrode composition paste was applied to both surfaces of an aluminum foil current collector of 30 μm thickness with a blade coater, so that the coated amount would be 400 g/$m^2$, and so that the thickness of the resulting sheet after being pressed would be 280 μm; and the sheet was dried, compression-molded by a roller press, and cut into a long and narrow positive electrode sheet having a prescribed size. It was dehydrated and dried sufficiently by an infrared heater in a dry box (dry air having a dew point of −50° C. or below), to obtain the intended positive electrode sheet (numeral 5 in the figure).

In the same way as for the above positive electrode sheet, the negative electrode composition paste was applied to a copper foil current collector having a thickness of 20 μm, to prepare a negative electrode sheet (4) having a coating amount of 70 g/$m^2$ and a thickness of 90 μm after compression.

Preparation Examples of Electrolytes (Examples 1 to 14)

Under an argon atmosphere, 65.3 g of diethyl carbonate was placed in a 200-ml narrow-necked polypropylene vessel, and 22.2 g of ethylene carbonate was dissolved, little by little, thereinto, with care taken so that the liquid temperature would not exceed 30° C. Then, 0.4 g of $LiBF_4$, and then 12.1 g of $LiPF_6$, were dissolved, little by little, thereinto, in the polypropylene vessel, with care taken so that the liquid temperature would not exceed 30° C. The obtained electrolyte (6) was a colorless transparent non-aqueous liquid having a specific gravity of 1.135. The water content thereof was 18 ppm (measured by an MKC 210-type Karl Fischer's Water Content Measuring Instrument (trade name; manufactured by Kyoto Denshi Kogyo KK), and the free acid content was 24 ppm (measured by neutralization titration with a 0.1N aqueous NaOH solution, using Bromothymol Blue as an indicator). Into this electrolytic solution, each compound listed in Table 1 was dissolved, so that a prescribed concentration would be attained, to adjust the electrolyte.

Preparation Example of a Cylinder Battery

The positive electrode sheet (5), a microporous polypropylene separator (3), the negative electrode sheet (4), and a separator were layered, in the stated order, successively and were rolled in a voluted fashion. This roll was accommodated in a bottomed cylindrical battery can (2) made of iron and plated with nickel, in which the can also served as a negative terminal. Then the electrolyte (6) containing the additive listed Table 1 as an electrolyte was injected into the battery can (2). A battery cover (8) with a positive terminal, an anti-explosion valve (7) whose thin section would be broken when internal pressure of the battery was increased, a PTC element (9), an internal lid (10), and a ring (11) for reinforcement, were mounted to the battery can (2) by caulking setting a gasket (1) made of polypropylene between them and the wall of the battery can to make up a cylindrical battery.

Comparative Example 1

A cylindrical battery was prepared in the same manner as in Example 1, except that to the electlytic solution the nitrogen containing compound as an additive was not added.

Comparative Examples 2 to 4

A negative electrode sheet was prepared in the same manner as in the above negative electrode sheet, except that, instead of the oxide negative electrode active material, a carbonaceous active material (graphite powder) was used. This negative electrode sheet and the electrolyte listed in Table 1 were used to make a cylindrical battery.

With respect to the batteries produced in the above manner, charging and discharging were carried out under such conditions that the current density was 5 mA/$cm^2$, the charge final voltage was 4.1 V, and the discharge final voltage was 2.8 V, to find the discharging capacity and the cycle life.

The ratio (%) of the initial capacity (Wh) (ratio of the initial capacity relative to that of the battery in Comparative Example 1) and the cyclability (ratio of the capacity of the 300th discharge and charge to the first discharge and charge (%)) of each battery are shown in Table 1.

TABLE 1

Results of experiments

| Experiment Example | Additive | Concentration of additive (mol/l) | Initial capacity (%) | Cyclability (%) |
| --- | --- | --- | --- | --- |
| Example 1 | diphenylamine | 0.001 | 100 | 82 |
| Example 2 | diphenylamine | 0.01 | 102 | 83 |
| Example 3 | diphenylamine | 0.05 | 97 | 82 |
| Example 4 | 1,8-diazabicyclo[5.4.0]-7-undecene | 0.001 | 100 | 88 |
| Example 5 | 1,8-diazabicyclo[5.4.0]-7-undecene | 0.01 | 101 | 91 |
| Example 6 | 1,8-diazabicyclo[5.4.0]-7-undecene | 0.05 | 103 | 90 |
| Example 7 | 2,2'-dipyridylamine | 0.001 | 100 | 86 |
| Example 8 | 2,2'-dipyridylamine | 0.01 | 101 | 87 |
| Example 9 | 2,2'-dipyridylamine | 0.05 | 97 | 85 |
| Example 10 | 1,4-diazabicyclo[2.2.2]octane | 0.01 | 99 | 84 |
| Example 11 | 2,2'-dipyridylamine | 0.01 | 98 | 83 |
| Example 12 | tributylamine | 0.01 | 102 | 86 |
| Example 13 | diisopropyl-ethylamine | 0.01 | 98 | 82 |
| Example 14 | 1,10-phenanthroline | 0.01 | 96 | 84 |
| Comparative Example 1 | none | 0 | 100 | 70 |
| Comparative Example 2 | none | 0 | 80 | 75 |
| Comparative Example 3 | diphenylamine | 0.01 | 81 | 80 |
| Comparative Example 4 | 1,8-diazabicyclo[5.4.0]-7-undecene | 0.001 | 78 | 82 |

In comparison with the battery wherein a carbonaceous negative electrode active material is used, the battery of the present invention, in which an oxide negative electrode active material is used, is large in capacity, and the battery in which an electrolyte containing an N-containing organic compound is used, is improved in cyclability, with the rate of the improvement being higher than that of the battery in which a carbonaceous negative electrode active material is used.

The batteries of the present invention are excellent in both initial capacity and cyclability.

Having described our invention as related to the present embodiments, it is our intention that the invention not be limited by any of the details of the description, unless otherwise specified, but rather be construed broadly within its spirit and scope as set out in the accompanying claims.

What we claim is:

1. A non-aqueous-electrolyte secondary battery comprising a positive electrode including a material capable of reversibly absorbing and releasing lithium, a negative electrode, a non-aqueous electrolyte containing a lithium salt, and a separator; wherein the negative electrode comprises a material mainly comprising an amorphous chalcogen compound and/or an amorphous oxide including three or more atoms selected from the group consisting of atoms of elements of Groups 1, 2, 13, 14 and 15 of the Periodic Table, and said non-aqueous-electrolyte contains at least one N-containing poly cyclic-condensation compound.

2. The non-aqueous-electrolyte secondary battery as claimed in claim 1, wherein the content of said at least one N-containing organic compound contained in the said non-aqueous-electrolyte is 0.001 to 10 wt. % based on the supporting electrolyte contained in the said electrolyte.

3. The non-aqueous-electrolyte secondary battery as claimed in claim 1, wherein said supporting electrolyte contains at least $LiBF_4$ and/or $LiPF_6$.

4. The non-aqueous-electrolyte secondary battery as claimed in claim 1, wherein the N-containing polycyclic-condensation compound is selected from the group consisting of 1,5-diazabicyclo[4.3.0]-5-nonene and 1,8-diazabicyclo[5.4.0]-7-undecene.

5. The non-aqueous-electrolyte secondary battery as claimed in claim 1, wherein at least one material of said negative electrode is represented by the general formula (1):

$$M_1M_{2p}M_{4q}M_{6r} \tag{1}$$

wherein $M_1$, and $M_2$, which are different from each other, each represent at least one atom selected from the group consisting of Si, Ge, Sn, Pb, P, B, Al, and Sb; $M_4$ represents at least one atom selected from the group consisting of Li, K, Na, Cs, Mg, Ca, Sr, and Ba; $M_6$ represents at least one atom selected from the group consisting of O, S, and Te; p and q are each a figure of 0.001 to 10, and r is a figure of 1.00 to 50.

6. The non-aqueous-electrolyte secondary battery as claimed in claim 1, wherein at least one material of said negative electrode is represented by the general formula (2):

$$SnM_{3p}M_{5q}M_{7r} \tag{2}$$

wherein $M_3$ represents at least one atom selected from the group consisting of Si, Ge, Pb, P, B, and Al; $M_5$ represents at least one atom selected from the group consisting of Li, K, Na, Cs, Mg, Ca, Sr, and Ba; $M_7$ represents at least one atom selected from the group consisting of C and S; p and q are each a figure of 0.001 to 10, and r is a figure of 1.00 to 50.

7. The non-aqueous-electrolyte secondary battery as claimed in claim 1, wherein the positive electrode comprises at least one material selected from the group consisting of $Li_xCoO_2$, $Li_xNiO_2$, $Li_xMnO_2$, $Li_xCo_aNi_{(1-a)}O_2$, $Li_xCo_bV_{(1-b)}O_z$, $Li_xCo_bFe_{(1-b)}Fe_{(1-b)}O_2$, $Li_xMn_2O_4$, $Li_xMn_cCo_{(2-c)}O_4$, $Li_xMn_cNi_{(2-c)}O_4$, $Li_xMn_cV_{(2-c)}O_4$, or $Li_xMn_cFe_{(2-c)}O_4$, wherein x=0.2 to 1.2, a=0.1 to 0.9, b=0.8 to 0.9, c=1.6 to 1.96, and z=2.01 to 2.3.

8. The non-aqueous-electrolyte secondary battery as claimed in claim 1, wherein electrode compositions containing the materials of positive and negative electrodes contain a binding agent.

* * * * *